United States Patent [19]

DeBisschop

[11] Patent Number: 5,575,581
[45] Date of Patent: Nov. 19, 1996

[54] CLAMP YOKE AND BOLT ASSEMBLY

[75] Inventor: James G. DeBisschop, Morris, Conn.

[73] Assignee: The Torrington Company, Torrington, Conn.

[21] Appl. No.: 434,891

[22] Filed: May 4, 1995

[51] Int. Cl.⁶ .............................. F16D 3/16; F16C 11/06; B21D 21/00
[52] U.S. Cl. .......................... 403/157; 403/52; 72/379.2; 464/134
[58] Field of Search ................................. 403/52, 57, 157, 403/158; 72/379.2; 464/134, 135, 905

[56]  References Cited

U.S. PATENT DOCUMENTS

| 1,742,689 | 1/1930 | Chandler . | |
|---|---|---|---|
| 1,903,863 | 4/1933 | Hayden . | |
| 2,208,547 | 7/1940 | Murphy | 403/57 X |
| 4,361,024 | 11/1982 | Haldric | 72/379.2 |
| 4,365,909 | 12/1982 | Stephan | 403/157 |
| 4,505,608 | 3/1985 | Haldric | 403/13 |
| 4,646,552 | 3/1987 | Kanbe | 72/379.2 X |
| 5,188,474 | 2/1993 | Ohkubo et al. | 72/379.2 X |
| 5,403,111 | 4/1995 | Wey | 464/134 X |

FOREIGN PATENT DOCUMENTS

| 195544 | 12/1982 | Japan | 72/379.2 |
|---|---|---|---|
| 1214244 | 12/1970 | United Kingdom | 464/134 |

*Primary Examiner*—Anthony Knight
*Attorney, Agent, or Firm*—Michael H. Minns

[57] ABSTRACT

A clamp yoke formed from a flat piece of metal. The flat piece being approximately T-shaped which is bent into the clamp yoke. The top portion of the T forming the yoke ears and the vertical portion forming two approximately parallel shaft portions. The yoke ears each having a bearing bore and the shaft portions each having a shaft receiving bore. The clamp yoke can be provided with a bolt having a reduced diameter middle which allows a shaft to be inserted into the shaft receiving bores without removing the bolt. The bolt is then tightened, drawing the larger diameter portion into the center of the clamp yoke where the bolt engages a transversely relieved portion on the shaft to axially retain the shaft.

12 Claims, 3 Drawing Sheets

CLAMP YOKE AND BOLT ASSEMBLY

BACKGROUND OF THE INVENTION

This invention relates generally to shaft connecting devices and more particularly to steering shaft clamp yokes.

When assembling steering shaft clamp yokes onto steering shafts, it is necessary to insert the steering shaft into the clamp yoke, insert the connecting bolt and attach a nut to the connecting bolt. To reduce the handling of separate parts, it is desirable to pre-assemble as much of the clamp yoke assembly as possible.

The foregoing illustrates limitations known to exist in present steering shaft clamp yokes. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a monolithic clamp yoke comprising: two ear portions, each ear portion having a bore therethrough; a shaft receiving body connecting the ear portions, the shaft receiving body having a shaft receiving bore therethrough and a bolt receiving bore therethrough, the shaft receiving body having a slot extending from an outer surface of the shaft receiving body to the shaft receiving bore; and a bolt and nut positioned within the bolt receiving bore and extending beyond the shaft receiving body, the bolt having a major diameter portion and a relieved area portion.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
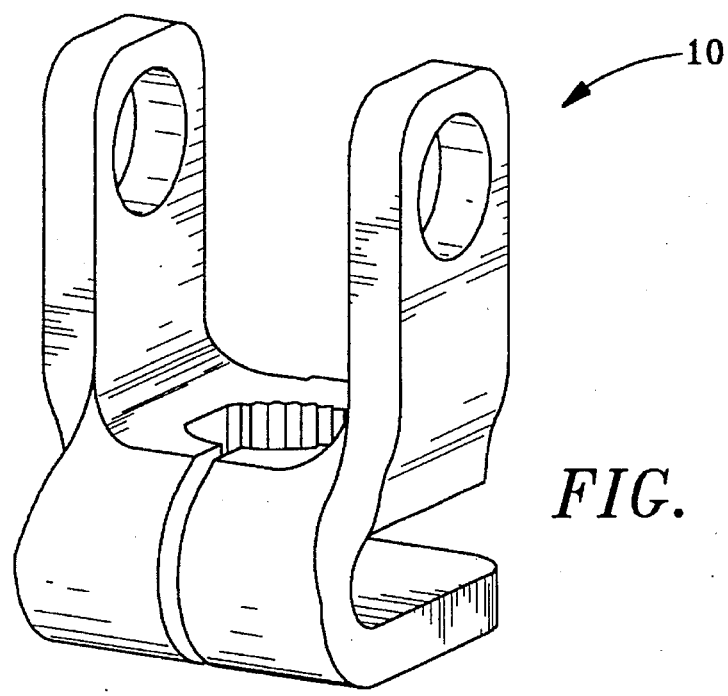
FIG. 1 is a perspective view of a one-piece stamped clamp yoke of the present invention.

FIG. 1 shows one embodiment of a clamp yoke 10 which has been formed from a flat piece of metal. Clamp yoke 10 consists of opposing ear portions 24 at right angles to two shaft receiving portions 12, 14. Each ear portion 24 contains a bearing bore 26 therethrough and each shaft receiving portion 12, 14 contains a shaft receiving bore 20 therethrough. A clamping slot 22 extends from one shaft receiving bore 20 through an arcuate connecting portion 18 to the other shaft receiving bore 20.

Figure 2:
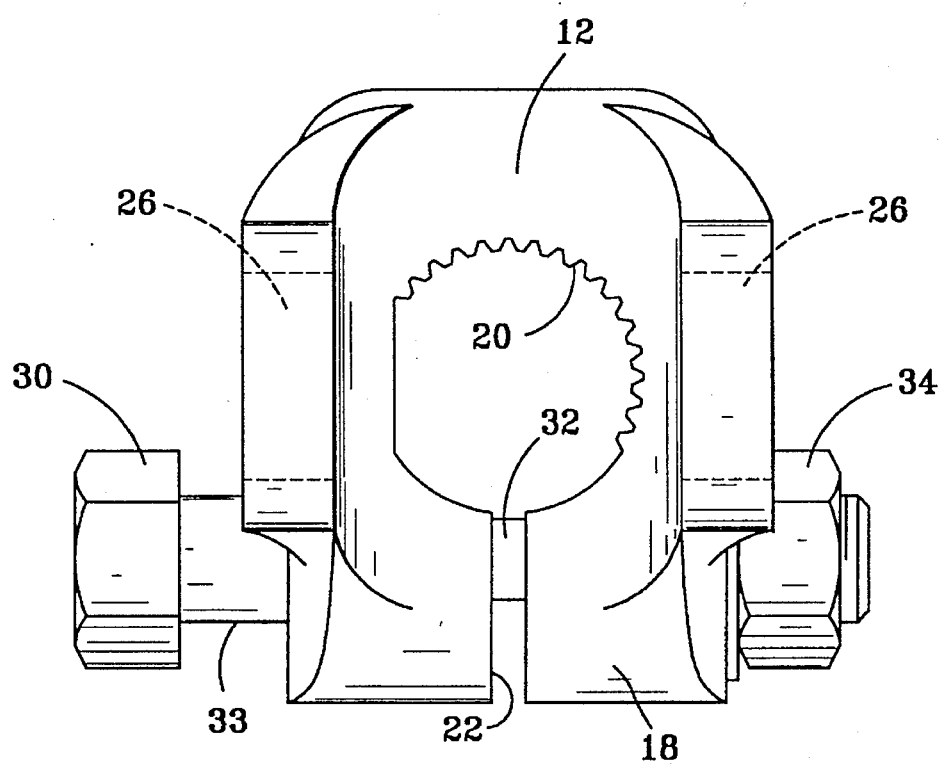
FIG. 2 is top view of the one-piece stamped clamp yoke shown in FIG. 1 with a clamping bolt installed.

FIG. 2 shows one embodiment of the clamp yoke 10 with a clamping bolt 30 and nut 34 installed in the area subtended by the arcuate portion 18. The clamping bolt 30 has a minor diameter or reduced diameter portion 32 which, prior to installation, is positioned adjacent the clamping slot 22. A shaft 40 having a transverse relieved area 42 near the end of the shaft 40 is inserted into the shaft receiving bores 20. The minor diameter portion 32 of the clamping bolt 30 permits the shaft 40 to be inserted into the shaft receiving bores 20 without removing the clamping bolt 30. In place of a reduced diameter, the bolt 30 could have a relieved area, such as a flat, which permits the shaft 40 to be inserted past the bolt 30. As the nut 34 is tightened, the larger or major diameter portion 33 of the clamping bolt 30 is drawn into and engages the transverse relieved area 42, thereby axially restraining the shaft 40 in the clamp yoke 10. The clamp yoke 10 is also tightened down against the shaft 40 as the clamping slot 22 closes. This prevents angular or rotational movement of the shaft 40 in the clamp yoke 10 and provides further axial retention of the shaft 40. In the event nut 34 loosens, the major diameter portion 33 provides axial retention of the shaft 40, even though the shaft 40 may be loose within the clamp yoke 10.

Figure 3:
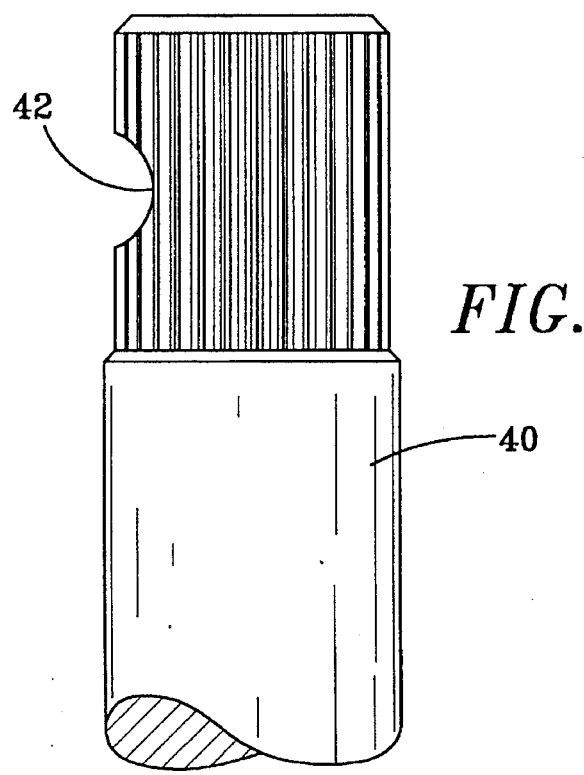
FIG. 3 is a side view of a portion of a shaft for use with the one-piece stamped clamp yoke shown in FIG. 1.
Figure 4:
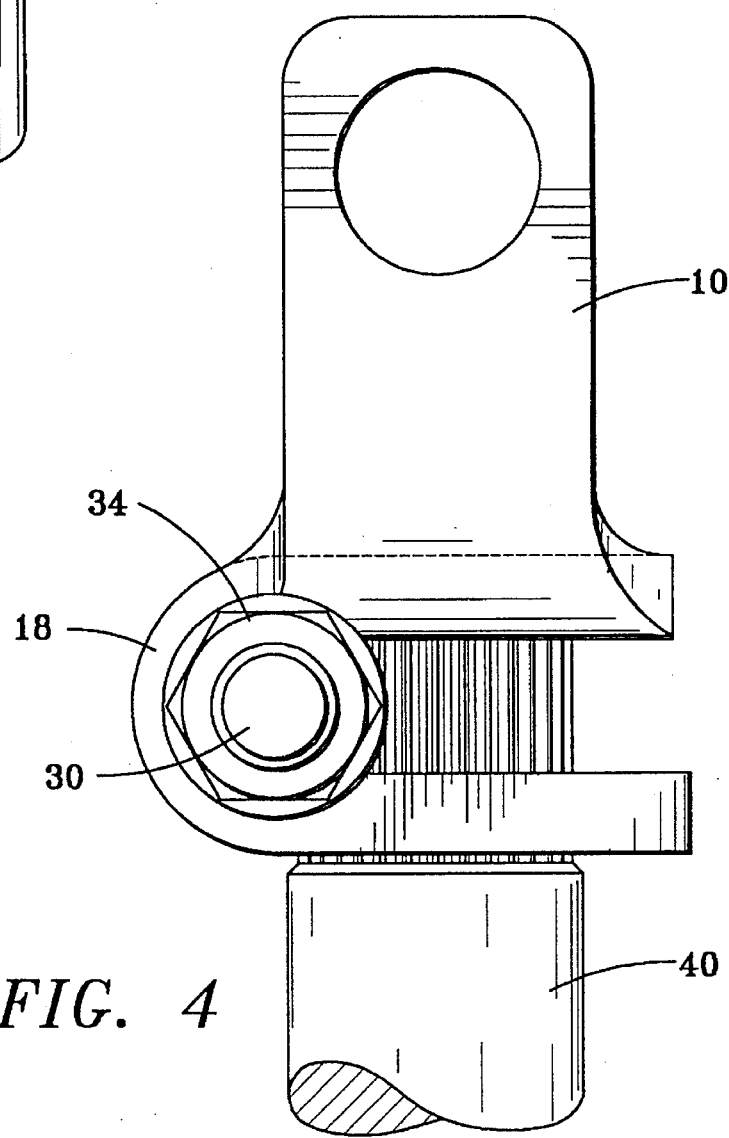
FIG. 4 is a side view of the one-piece stamped clamp yoke shown in FIG. 1 with the shaft shown in FIG. 3 installed.
Figure 5:
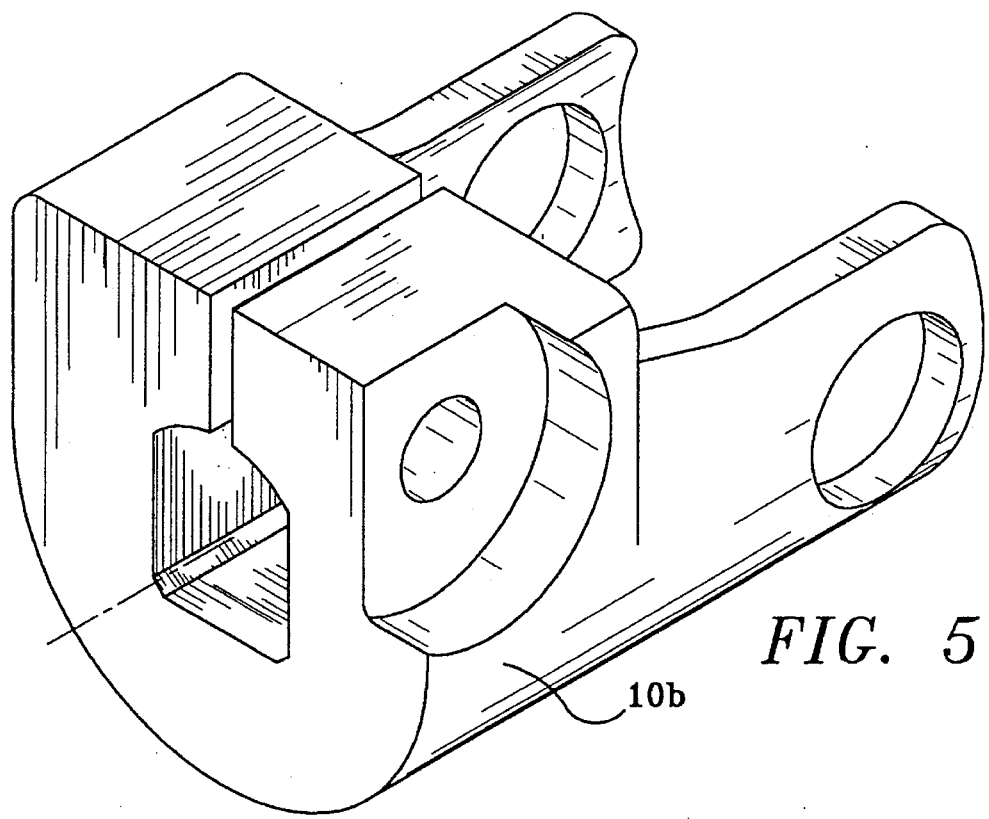
FIG. 5 is a perspective of a typical solid yoke clamp.
Figure 6:
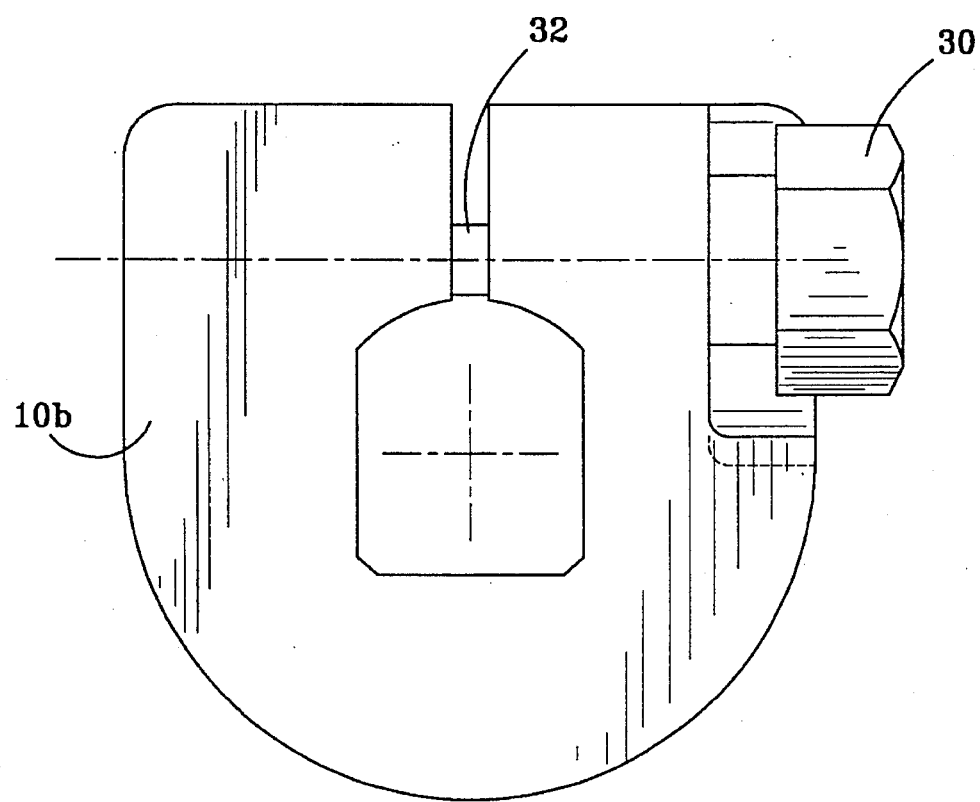
FIG. 6 is an end view of the solid yoke clamp shown in FIG. 5 with the shaft shown in FIG. 3 installed.

In another embodiment of the present invention, shown in FIGS. 5 and 6, a clamping bolt 30 with a relieved area 32 is used with a solid clamp yoke 10b. Clamping bolt 30 interacts with the shaft 40 as described above for FIGS. 3 and 4.

Having described the invention, what is claimed is:

1. A monolithic clamp yoke comprising:

two ear portions, each ear portion having a bore therethrough;

a shaft receiving body connecting the ear portions, the shaft receiving body having a shaft receiving bore therethrough and a bolt receiving bore therethrough, the shaft receiving body having a slot extending from an outer surface of the shaft receiving body to the shaft receiving bore; and a bolt and nut positioned within the bolt receiving bore and extending beyond the shaft receiving body, the bolt having a major diameter portion and a relieved area portion.

2. The monolithic clamp yoke according to claim 1, wherein the bolt relieved area portion permits a shaft to be inserted into the shaft receiving bore when the bolt relieved area portion is adjacent the slot and the bolt major diameter portion interacts with a relieved portion on the shaft to prevent the shaft from being removed from the shaft receiving bore when the bolt major diameter portion is adjacent the slot.

3. The monolithic clamp yoke according to claim 2, wherein the bolt relieved area portion comprises a reduced diameter portion.

4. The monolithic clamp yoke according to claim 1, wherein the shaft receiving body comprises:

a first shaft receiving portion connecting the ear portions;

a second shaft receiving portion generally opposed to the first shaft receiving portion and being connected to the first shaft receiving portion by an arcuate portion;

the shaft receiving bore extending through the first and second shaft receiving portions in common axis alignment.

5. A monolithic clamp yoke comprising:

two ear portions forming a yoke, one ear portion being spaced apart and generally opposed from the other ear portion, each ear portion having a bore therethrough, the bores being aligned on a common axis;

a first shaft receiving portion connecting the ear portions;

a second shaft receiving portion generally opposed to the first shaft receiving portion and being connected to the first shaft receiving portion by an arcuate portion;

each of the first and second shaft receiving portions having a shaft receiving bore in common axis alignment therethrough;

a slot extending through the arcuate portion from one shaft receiving portion bore to the other shaft receiving portion bore; and a bolt and nut positioned within and extending beyond the arcuate portion, the bolt having a major diameter portion and a relieved area portion.

6. The monolithic clamp yoke according to claim 5, wherein the arcuate portion forms a tubular bolt receiving hole.

7. The monolithic clamp yoke according to claim 6, wherein a portion of the tubular bolt receiving hole is threaded.

8. The monolithic clamp yoke according to claim 5, wherein the bolt relieved area portion permits a shaft to be inserted into the shaft receiving bores when the bolt relieved area portion is adjacent the slot and the bolt major diameter portion interacts with a relieved portion on the shaft to prevent the shaft from being removed from the shaft receiving bores when the bolt major diameter portion is adjacent the slot.

9. The monolithic clamp yoke according to claim 5, wherein the bolt relieved area portion comprises a reduced diameter portion.

10. A clamp yoke comprising:

a yoke member having a solid body with shaft receiving bore therein and two ear portions forming a yoke extending therefrom, one ear portion being spaced apart and generally opposed from the other ear portion, each ear portion having a common axis aligned bore therethrough, a slot extending from an outer surface of the solid body to the shaft receiving bore and a transversely extending bolt hole intersecting the slot;

a bolt positioned within and extending beyond the bolt hole; and a means for threadedly engaging the bolt;

the bolt having two major diameter portions and a relieved area portion between the major diameter portions, the relieved area portion permitting a shaft to be inserted into the shaft receiving bore when the relieved area portion is adjacent the slot and the major diameter portion interengaging a relieved portion on the shaft to prevent the shaft from being removed from the shaft receiving bore when the major diameter portion is adjacent the slot.

11. The clamp yoke according to claim 10, wherein the bolt relieved area portion is a reduced diameter portion.

12. A method of assembling a clamp yoke, a threaded bolt and a shaft, the clamp yoke having a solid body with a shaft receiving bore therein and two ear portions forming a yoke extending therefrom, one ear portion being spaced apart and generally opposed from the other ear portion, each ear portion having a common axis aligned bore therethrough, a slot extending from an outer surface of the solid body to the shaft receiving bore and a transversely extending bolt hole intersecting the slot, a portion of the bolt hole being threaded, the bolt having a major diameter portion and a relieved area portion, the shaft having a relieved portion proximate an end of the shaft, the method comprising, in order, the following steps:

inserting the bolt into the bolt hole of the yoke, threadedly engaging the threaded bolt with the bolt hole threaded portion, and positioning the bolt relieved area portion within the shaft receiving bore of the yoke;

inserting the shaft into the shaft receiving bore;

aligning the shaft relieved portion with the bolt relieved area portion;

tightening the bolt until the bolt major diameter portion engages the shaft relieved portion.

\* \* \* \* \*